May 22, 1956   H. A. GEISLER ET AL   2,746,245
FREEZE PREVENTION IN JET AIRCRAFT PURGE GAS GENERATORS
Filed Feb. 20, 1953   2 Sheets-Sheet 1
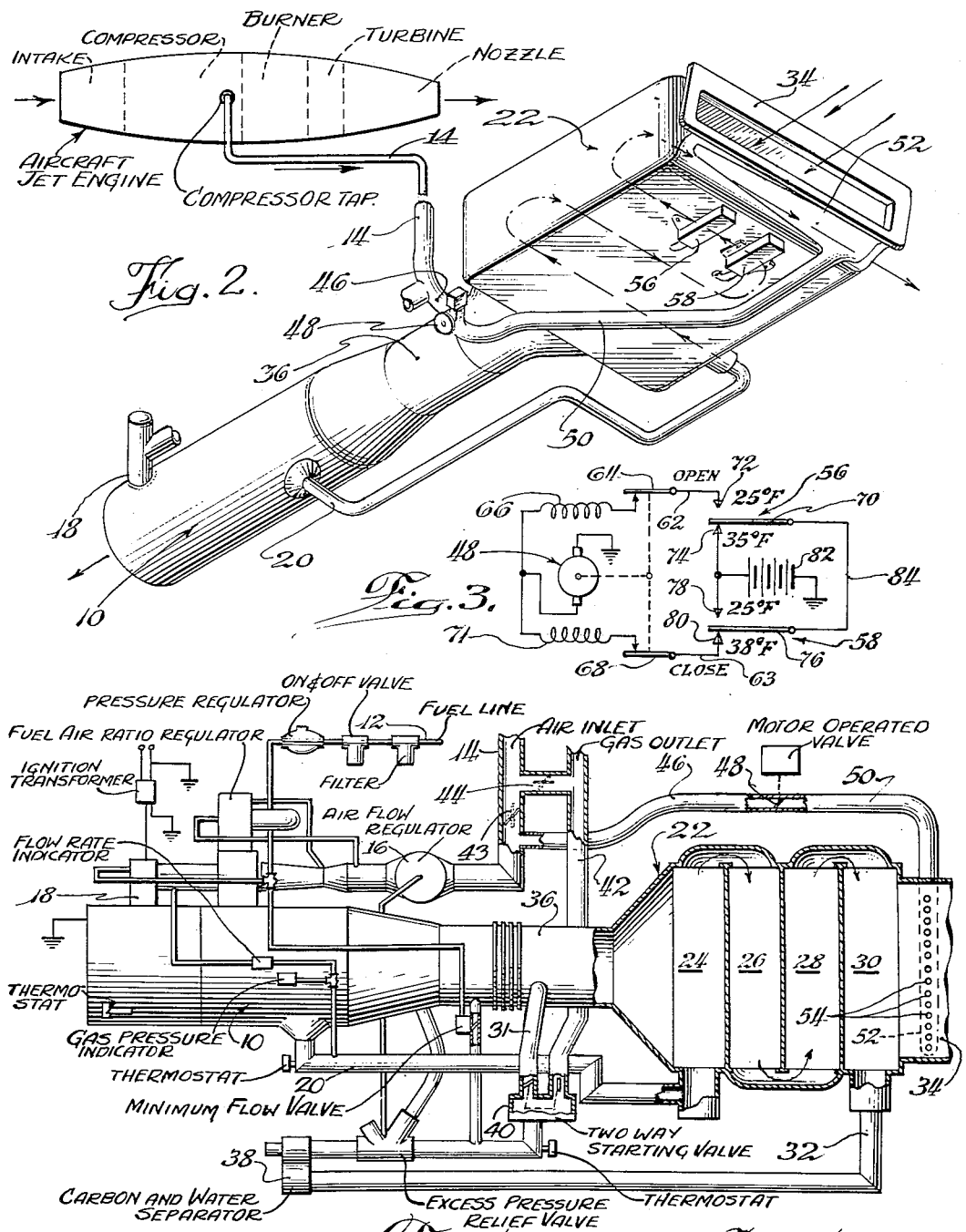

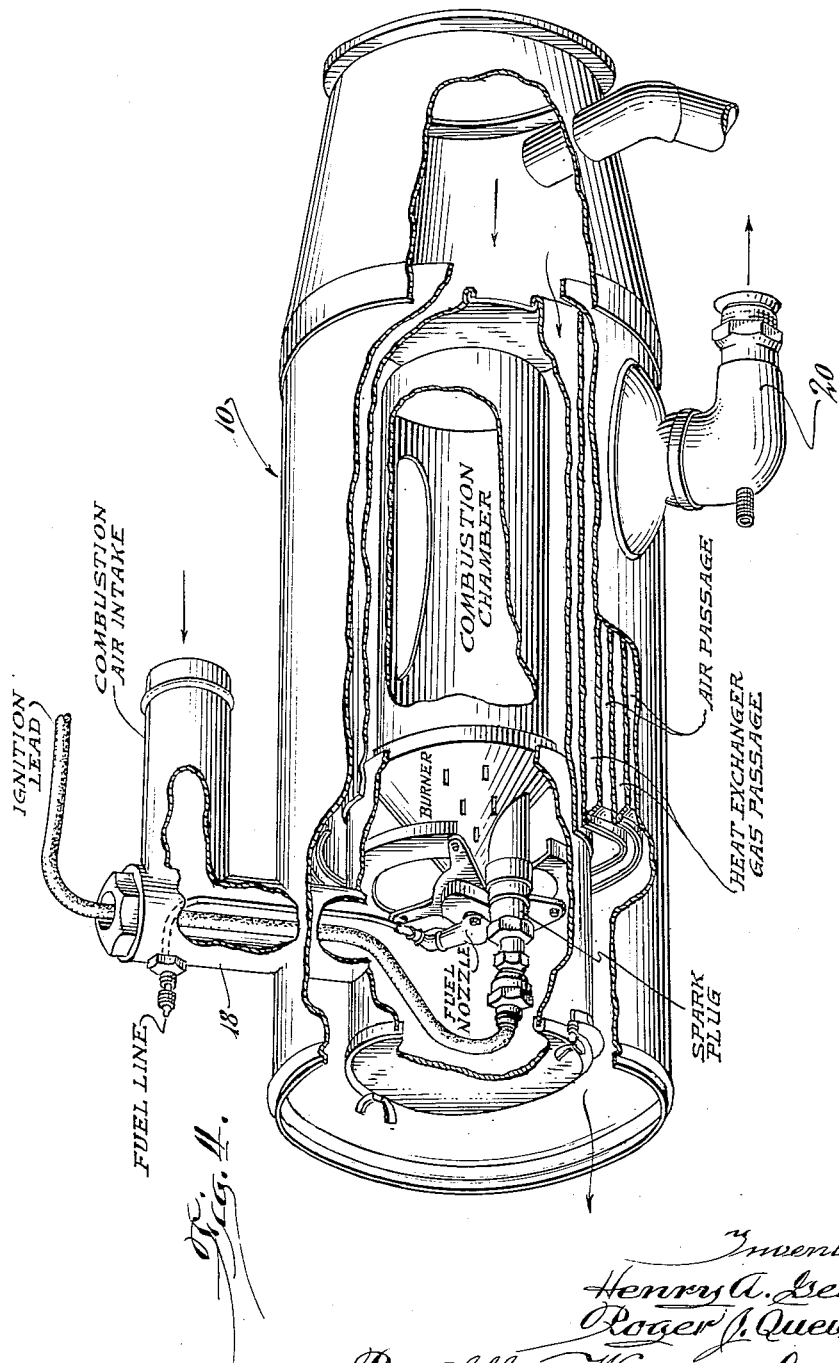

United States Patent Office 2,746,245
Patented May 22, 1956

2,746,245

FREEZE PREVENTION IN JET AIRCRAFT PURGE GAS GENERATORS

Henry A. Geisler and Roger J. Queisser, Indianapolis, Ind., assignors to Stewart-Warner Corporation, Chicago, Ill., a corporation of Virginia Application February 20, 1953, Serial No. 337,933

3 Claims. (Cl. 60—39.07)

The present invention relates to purge gas generators for jet aircraft and more particularly to the prevention of freezing in such generators under flight conditions where it would otherwise take place.

As is more completely described in the copending application of Donald A. Potter and Henry A. Geisler, Serial No. 324,974, filed December 9, 1952, and assigned to the same assignee of record as the present application, there is much closed space within any aircraft, which is not occupied by personnel and in which explosions or fires may occur. This is because accident or damage may permit fuel to leak from the fuel cells into these spaces and mix with atmospheric air. Also of course, the vapor and air mixture above the fuel in the cells will be combustible under some conditions. This is a more hazardous condition with jet engine fuels than it is with gasoline. In the above mentioned copending application, a complete system for maintaining all such spaces under slight positive pressure with an inert gas is explained and illustrated. In general, the principle involved is to form a combustible mixture of the aircraft fuel and air in a special sealed burner and to burn this mixture under carefully controlled conditions so as to obtain products of combustion which are rich in nitrogen and carbon dioxide, with only slight traces of oxygen being present. This mixture is then cooled and treated to remove the major portion of the water formed by the combustion, and the corrosive elements similarly formed before passing the gases to the spaces to be purged.

In any such system considerable water formed as a product of combustion is condensed from the gases during the cooling step and can subsequently be separated in its liquid phase. There is danger under some conditions, however, that excessive cooling of the products of combustion may reduce their temperature below the freezing point of water, with the result that water condensed out of the products of combustion may freeze within the heat exchanger or subsequent passages, thereby causing malfunctioning of the apparatus. One system for preventing such freezing is described and illustrated in the previously referred to copending application and the primary objective of the present invention is to provide an alternative and improved method and structure for dealing with this freezing problem.

Because of the general similarity of the present apparatus to that described in the previously referred to copending application, the equipment of the present invention need not be described in detail and therefore will be outlined only briefly, the detailed discussion being reversed for the portions of the present apparatus which differ over that of the above mentioned copending application.

It is one of the objects of the present invention to provide a novel, simple, and effective means for preventing freezing in the combustion gas passages of an aircraft purge gas generator under a wide variation in circumstances.

A further object is to accomplish the above with a minimum of equipment in such manner as to take full advantage of equipment already available in a jet powered aircraft.

Other objects and advantages will become apparent from the following description of a preferred embodiment of our invention which is illustrated in the accompanying drawings in which:

Fig. 1 is a diagrammatic representation of a purge gas generator in which features of the present invention have been embodied;

Fig. 2 may be considered as a perspective view looking diagonally upwardly at the main portions of the apparatus of Fig. 1;

Fig. 3 is an electrical circuit diagram of the freeze prevention apparatus; and

Fig. 4 is a fractional view, partially in section, of the apparatus of Fig. 1, showing in greater detail the construction of the combination burner and primary heat exchanger.

In Fig. 2 the view has been stripped of the major portion of the accessory and control equipment illustrated diagrammatically in Fig. 1, so as to direct attention more specifically to the present invention.

Referring now primarily to Fig. 1 of the drawings, the apparatus includes a burner and primary heat exchanger constructed as a unit and indicated generally at 10. As is apparent in Fig. 4, the burner receives combustion air by way of a tube 18 and liquid fuel through the line so indicated. The fuel is sprayed through a conventional nozzle and is ignited by a spark plug so as to produce hot products of combustion within the combustion chamber. These hot products of combustion move generally outwardly through concentric heat exchange passages in heat exchange relation to a longitudinally flowing air stream, and eventually arrive at the inlet to a gas duct 20. This structure should be rugged and able to withstand high temperatures and accompanying stresses and, therefore, preferably should not be called upon to bring about complete cooling of the products of combustion, but merely the tempering thereof to a level such that a less heat resistant, but thermodynamically more efficient structure can complete the cooling.

Air for combustion is supplied to the burner by way of a line 14 which is connected as will appear presently to receive air at relatively high pressure and temperature. The combustion air passes through the lines 14 preferably by way of an air-flow regulator indicated at 16. This unit may be of conventional type and is supplied for the purpose of insuring a relatively constant pressure on the outlet side thereof throughout a wide range of pressure fluctuation at the inlet to the tube 14. From the pressure regulator 16 the combustion air flows to the burner inlet 18 by way of a fuel-air ratio regulator which operates in a well known manner to sense the rate of air-flow to the burner and to regulate the fuel pressure at the nozzle so that the fuel-air ratio within the burner remains relatively constant. Fuel arrives from a suitable source by way of the line indicated in Fig. 1 and passes to the nozzle in succession through a filter, and an off-valve, a pressure regulator, and the fuel air ratio regulator.

Products of combustion leaving the generator 10 flow through the duct 20 to the inlet of a secondary heat exchanger indicated generally at 22.

Within the secondary heat exchanger the products of combustion make four passes indicated at 24, 26, 28 and 30 through four groups of tube bundle, with the products of combustion exhausting from the last pass 30 by way of a duct 32. Ambient air collected by a scoop or ram in the aircraft slip stream for cooling the two heat exchangers enters the secondary heat exchanger by way of a shroud 34 and passes toward the left across the tube bundles 30, 28, 26, 24 in that order and thence through a transition section 36 to the primary heat exchanger associated directly with the burner and within the casing 10, the heated air issuing from the left hand end of the assembly 10. Within the duct 32 the products of combustion are cool and a large portion of the water of combustion is in the liquid phase. It is therefore easily separated from the gas stream by a carbon and water cyclone type separator indicated at 38, the gas then passing through a two-way valve 40 to the outlet duct 42 which leads to the spaces to be purged. In order to permit air from the source which is connected to the equipment at 14 to flow to the fuel cells when the purge gas generator is not operating, air flow to the generator is prevented by closure of a valve 43 in the inlet line 14, and a bypass valve is provided at 44 in a connection between the inlet air duct 14 and the outlet gas duct 42.

The two-way valve at 40 may be conventional. As an example, it may comprise a valve structure as illustrated having an inlet and two outlets. Each of these outlets has a damper therein and the dampers are interconnected so that when one is opened the other is closed. In one position, therefore, this valve connects the inlet side thereof, that is the duct 32, with the outlet pipe 42 leading to the spaces to be purged. When the valve 40 is shifted to its alternative position, this connection is closed and the purge gas conduit 32 is connected to a branch 31 leading into the transition section 36. The valve in this position, therefore, allows the purge gases to be passed overboard of the aircraft along with the cooling air passing through the transition section 36. This position of the valve is ordinarily used only while starting the equipment into operation, and is maintained until combustion has become well established so as to avoid the possibility of conveying products of combustion which still contain some unburned fuel and air into the spaces to be purged. A pressure release or safety valve indicated in Fig. 1 has its outlet connected into the transition section 36 and is for the purpose of providing an outlet for the gas side of the system in the event that the pressure therein should rise sufficiently to approach an unsafe operating level. A second safety valve for a similar purpose is also indicated in Fig. 4.

The minimum flow valve in Fig. 1 temporarily opens to connect the purge gas line 32 to the transition section 36 if the fuel pressure temporarily falls sufficiently to indicate that the rate of air supply to the burner is at a minimum to insure efficient combustion. Opening this valve increases the air-flow rate and restores the system to a higher level of operation. The flow rate indicator and the pressure indicator respectively indicate the relative combustion air pressures at the inlet and outlet of the generator 10, and hence the rate of gas flow, and the pressure at the generator outlet. Thermostats are also provided to indicate the ventilating air outlet temperature, the temperature of the purge gas flowing to the fuel cells, and the temperature at the outlet of the generator 10. These indicating elements are useful in monitoring the operation of the system.

The inlet duct 14, downstream of the valve 43 but before it reaches the combustion apparatus or any of the controls therefor, is connected to a branch duct 46 which leads to an electric motor operated valve 48 and from the outlet of this valve to a duct 50 connected to a plenum chamber 52 which extends across one side of the inlet shroud 34. This plenum chamber is sealed around its edges to the shroud and is connected to the interior of the shroud by a plurality of perforations 54, such that air passing through the duct 50 can flow through the plenum chamber 52 and thence by way of the perforations 54 to the interior of the shroud 34 and thus mix with the ram collected cooling air passed through the heat exchanger.

By operation of the electric motor driven valve 48 to an appropriate position a desired portion of the air entering the inlet 14 can be diverted so as to mix with the cold air entering the secondary heat exchanger 22.

The air inlet duct 14 is connected to one of the air compression stages of the aircraft jet engine and therefore receives air at relatively high pressures and at relatively high temperature inasmuch as much of the heat of compression is still present. It has been found that under ordinary operating conditions air can be received from this source at a temperature in excess of 300° F. Thus, diverting an appropriate quantity of this air and mixing it with the cooling air flowing to the heat exchanger 22 results in the cooling air reaching the last pass 30 of the combustion gases at a temperature well above freezing, thereby insuring that under no conditions will water condensed from the products of combustion freeze within the secondary heat exchanger 22 or other passages downstream thereof.

Operation of the motor driven valve 48 is controlled by a pair of thermostatically operated switches indicated at 56 and 58 positioned so as to be sensitive to the temperature of the air after it has passed through the heat exchange tubes comprising the first pass 30. Both of these switches are of the single pole, double throw, snap acting precision type. Of these, switch 56 has a swinging element 70 which engages contact 72 when the temperature of its sensitive element drops to 25° F. When the temperature rises to 35° F., the movable contact snaps away from contact 72 and against contact 74. Switch 58 is of the same type, excepting that its movable contact 76 engages contact 78 when the temperature drops to 25° F. and snaps away from this position and against contact 80 when the temperature rises to 38° F.

The valve 48 is of the well known type which is driven by a reversible electric motor to closed or open position or to any intermediate position and remains in its last position whenever deenergized. When it reaches the end of its travel in either direction, limit switches are operated to deenergize the valve motor as is shown in Fig. 3 where it will be seen that when lead 62 is energized, this causes current to flow to a single pole single throw limit switch 64 which when closed supplies energy to the motor winding 66. This winding 66 when energized runs the valve toward open position. Similarly, lead 63 is connected through a second limit switch 68 to a motor winding 71 which when energized runs the valve toward closed position. The limit switches 64 and 68 are operated mechanically by the motor such that when the motor is running both switches are ordinarily closed. If it is running in the direction to close the valve it will open switch 68 when the valve is closed and stop the motor. Conversely, when the motor winding 66 is energized, the motor will start running the valve toward open position. This closes switch 68 and when the valve is fully open, switch 64 is open.

From Fig. 3 it will be seen that contacts 74 and 78 are connected together and to one pole of a battery 82, the other terminal of which is grounded as is one terminal of the motor 48. Contact 72 is connected to one motor lead 62 while contact 80 is connected to the other motor lead 63. The two swinging contacts 70 and 76 are connected together by a lead 84.

Assume now that the system is operating and that the cooling air after passing the first group of heat exchange tubes 30 is above 38° F. Under these conditions, switch blade 70 will be against contact 74 and blade 76 will rest against contact 80. Current, therefore, flows from the battery 82 to contact 74 and thence by way of contact 70, lead 84, contact 76, and contact 80 to motor lead 63. The motor therefore closes the valve and is deenergized by the opening of limit switch 68.

If the temperature of the air after the first heat exchanger pass 30 drops, when it reaches 25° F. switch blade 70 shifts away from contact 74 and against contact 72 and switch blade 76 shifts from contact 80 to contact 78. This deenergizes motor lead 73 and energizes lead 62 by way of battery 82, contacts 78 and 76, lead 84 and contacts 70 and 72. This causes the valve to start opening so as to divert hot air from the duct 14 by way of the branch 46—50 to the cooling air stream passing through the shroud 34. The temperature of the cooling air therefore is increased. This opening movement continues slowly until the temperature rises to 35° F. at which point switch blade 70 shifts from contact 72 to 74, thereby deenergizing the motor opening circuit 66 so as to maintain a temperature at the switches 56 and 58 of 35° F. Ordinarily the temperature will overshoot only slightly, but if for any reason the temperature rises to 38° F., switch blade 76 will return to contact 80, thus closing the valve in the manner first explained.

The valve therefore, is adjusted automatically as is necessary to add an appropriate quantity of hot compressor air to the cooling air stream to maintain a temperature after the first heat exchanger pass of between 25° F. and 38° F. Above 38° F. no hot air is added.

The temperatures given are illustrative only and simply reflect the fact that with the particular equipment involved, a temperature of the cooling air after the first heat exchanger pass of not lower than 25° F. will insure the purge gases not falling below a temperature of 40° F. at the spaces to be purged. The invention therefore insures in a simple fashion that conditions are always such that no freezing is possible at any place in the system where moisture may condense from the purge gases, but the system does not divert hot compressor air for this purpose unnecessarily when the temperature of the purge gases is safely above 40° F.

Having described our invention as incorporated in a particular illustrative embodiment thereof, what we claim as new and useful and desire to secure by Letters Patent of the United States is:

1. In a purge gas generating system for use in an aircraft which has a combustion turbine engine provided with an air compressor section therein which serves as a source of air at high temperature and pressure, the combination comprising: means forming a conduit having an inlet adapted for connection to said compressor section to receive said high pressure, high temperature air, said conduit having an outlet connection, combustion chamber forming means having an air inlet, a fuel inlet and an outlet for products of combustion, said combustion chamber air inlet being connected to said conduit outlet, means for supplying fuel to said fuel inlet, heat exchanger means having a gas passage and an air passage, said passages being in heat exchange relationship to each other, said gas outlet being connected to one end of said gas passage, a conduit leading to spaces to be purged, the last said conduit having an inlet connected to the other end of said gas passage, cold air duct means connected to one end of said air passage to supply cold air thereto, bypass forming means having an inlet and an outlet, said bypass inlet being connected into said first conduit, said bypass outlet being connected into said cold air duct means, valve means for regulating the rate of flow through said bypass means, and means sensitive to the temperature of said heat exchanger means to operate said valve to increase the flow through said bypass means when the temperature of said heat exchanger means drops below a predetermined minimum.

2. In a purge gas generating system for use in an aircraft which has a combustion turbine engine provided with an air compressor section therein which serves as a source of air at high temperature and pressure, the combination comprising: means forming a conduit having an inlet adapted for connection to said compressor section to receive said high pressure, high temperature air, said conduit having an outlet connection, combustion chamber forming means having an air inlet, a fuel inlet and an outlet for products of combustion, said combustion chamber air inlet being connected to said conduit outlet, means for supplying fuel to said fuel inlet, heat exchanger means having a gas passage and an air passage, said passages being in heat exchange relationship to each other, said gas outlet being connected to one end of said gas passage, a conduit leading to spaces to be purged, the last said conduit having an inlet connected to the other end of said air passage, cold air duct means connected to one end of said air passage to supply cold air thereto, bypass forming means having an inlet and an outlet, said bypass inlet being connected into said first conduit, said bypass outlet being connected into said cold air duct means, valve means for regulating the rate of flow through said bypass means, and means sensitive to the temperature in said heat exchanger means to open said valve when the temperature in said heat exchanger means drops below a predetermined level and to open said valve when the temperature rises a predetermined amount above said level.

3. In a purge gas generating system for use in an aircraft which has a combustion turbine engine provided with an air compressor section therein which serves as a source of air at high temperature and pressure, the combination comprising: means forming a conduit having an inlet adapted for connection to said compressor section to receive said high pressure, high temperature air, said conduit having an outlet connection, combustion chamber forming means having an air inlet, a fuel inlet and an outlet for products of combustion, said combustion chamber air inlet being connected to said conduit outlet, means for supplying fuel to said fuel inlet, heat exchanger means having a gas passage and an air passage, said passages being in heat exchanger relationship to each other, said gas outlet being connected to one end of said gas passage, a conduit leading to spaces to be purged, the last said conduit having an inlet connected to the other end of said air passage, cold air duct means connected to one end of said air passage to supply cold air thereto, bypass forming means having an inlet and an outlet, said bypass inlet being connected into said first conduit, said bypass outlet being connected into said cold air duct means, valve means for regulating the rate of flow through said bypass means, and temperature sensitive means adapted to operate said valve to increase the flow through said bypass when the temperature at a selected location in the system approaches a level indicative of freezing someplace in the system.

References Cited in the file of this patent
UNITED STATES PATENTS

| | | |
|---|---|---|
| 2,278,204 | Lewis | Mar. 31, 1942 |
| 2,491,462 | Wood | Dec. 13, 1949 |
| 2,507,044 | Palmatier | May 9, 1950 |
| 2,551,241 | Buckland | May 1, 1951 |